US012493709B2

(12) United States Patent
Borth et al.

(10) Patent No.: US 12,493,709 B2
(45) Date of Patent: Dec. 9, 2025

(54) MANAGING A FILE TRANSFER PROCESS FOR AUTOMATIC DATABASE UPDATE

(71) Applicant: Truist Bank, Charlotte, NC (US)

(72) Inventors: Randy Borth, Charlotte, NC (US); WeiJen Lu, Raleigh, NC (US); Sandeep Bodireddy, Charlotte, NC (US); Ramesh Namireddy, Charlotte, NC (US); Dhruval Patel, Atlanta, GA (US); Padmaja Challa, Charlotte, NC (US); Rajashekara Yellari, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/667,161

(22) Filed: May 17, 2024

(65) Prior Publication Data

US 2025/0356038 A1 Nov. 20, 2025

Related U.S. Application Data

(63) Continuation of application No. 18/666,941, filed on May 17, 2024.

(51) Int. Cl.
*G06F 21/62* (2013.01)
*G06F 21/60* (2013.01)

(52) U.S. Cl.
CPC ........ *G06F 21/6218* (2013.01); *G06F 21/606* (2013.01)

(58) Field of Classification Search
CPC .. G06F 16/2365; G06F 16/183; G06F 21/602; G06F 21/6218; G06F 21/606
See application file for complete search history.

(56) References Cited

U.S. PATENT DOCUMENTS

| | | | |
|---|---|---|---|
| 10,503,553 B1* | 12/2019 | Ashok | G06F 11/3024 |
| 12,019,778 B1* | 6/2024 | Bercovitz | G06F 21/6218 |
| 2005/0083960 A1* | 4/2005 | Gutierrez | H04L 67/12 |
| | | | 370/428 |
| 2017/0201498 A1* | 7/2017 | Baig | G06F 21/6254 |

* cited by examiner

*Primary Examiner* — Tyler J Torgrimson
(74) *Attorney, Agent, or Firm* — Kilpatrick Townsend & Stockton LLP; Michael A. Springs, Esq.

(57) ABSTRACT

A system can be used to monitor a file enrichment process to automatically update a cloud database. The system can transfer a file from a mainframe database to an intermediary system prior to transferring the file to a cloud database to enrich the file. The file can include a set of encrypted values corresponding to interaction data of one or more interactions. Subsequently, the system can apply a key rotation process to replace a first encryption key associated with the set of encrypted values with a second encryption key. The system can detect that the file has stopped at a particular intermediary system prior to being transferred to the cloud database. In response, the system can determine an action to perform at the particular intermediary system to continue transferring the file to the cloud database. The system can output a command to the particular intermediary system to perform the action.

20 Claims, 4 Drawing Sheets

MANAGING A FILE TRANSFER PROCESS FOR AUTOMATIC DATABASE UPDATE

CROSS-REFERENCE TO RELATED APPLICATIONS

This application is a continuation of U.S. patent application Ser. No. 18/666,941, filed May 17, 2024, titled "MANAGING A FILE TRANSFER PROCESS FOR AUTOMATIC DATABASE UPDATE," the entirety of which is incorporated herein by reference.

TECHNICAL FIELD

The present disclosure relates generally to data management and, more particularly (although not necessarily exclusively), managing a file transfer process for an automatic database update.

BACKGROUND

Filing systems, whether digital or by paper, may vary in format. Files in one format may not be correctly interpreted when submitted to a system designed to receive a different format. For example, a record may have an address in a second field of the record. The record, which may be designed for a first database, may be migrated to a second database expecting different information in the second field of the record. As a result, the second database may record incorrect information or may reject the information.

SUMMARY

In one example, a system includes a processor and a memory that includes instructions executable by the processor for causing the processor to perform operations. The operations can transferring a file from a mainframe database to an intermediary system prior to transferring the file to a cloud database to enrich the file at the cloud database. The file can include a set of encrypted values corresponding to interaction data of one or more interactions. The operations can include, subsequent to transferring the file to the intermediary system, applying a key rotation process to replace a first encryption key associated with the set of encrypted values of the file with a second encryption key. The intermediary system can generate an updated set of encrypted values using the second encryption key while maintaining access to the set of encrypted values. The operations can include detecting that the file has stopped at a particular intermediary system prior to being transferred to the cloud database. The particular intermediary system can correspond to the intermediary system or another intermediary system via which the file is transferred from the mainframe database to the cloud database. The operations can include, in response to detecting that the file has stopped at the particular intermediary system, determining an action to perform at the particular intermediary system to continue transferring the file to the cloud database. The operations can include outputting a command to the particular intermediary system to perform the action.

In another example, a computer-implemented method can transferring a file from a mainframe database to an intermediary system prior to transferring the file to a cloud database to enrich the file at the cloud database. The file can include a set of encrypted values corresponding to interaction data of one or more interactions. The computer-implemented method can include, subsequent to transferring the file to the intermediary system, applying a key rotation process to replace a first encryption key associated with the set of encrypted values of the file with a second encryption key. The intermediary system can generate an updated set of encrypted values using the second encryption key while maintaining access to the set of encrypted values. The computer-implemented method can include detecting that the file has stopped at a particular intermediary system prior to being transferred to the cloud database. The particular intermediary system can correspond to the intermediary system or another intermediary system via which the file is transferred from the mainframe database to the cloud database. The computer-implemented method can include, in response to detecting that the file has stopped at the particular intermediary system, determining an action to perform at the particular intermediary system to continue transferring the file to the cloud database. The computer-implemented method can include outputting a command to the particular intermediary system to perform the action.

In yet another example, a non-transitory computer-readable medium includes program code executable by a processor device for causing the processor device to perform operations. The operations can include transferring a file from a mainframe database to an intermediary system prior to transferring the file to a cloud database to enrich the file at the cloud database. The file can include a set of encrypted values corresponding to interaction data of one or more interactions. The operations can include, subsequent to transferring the file to the intermediary system, applying a key rotation process to replace a first encryption key associated with the set of encrypted values of the file with a second encryption key. The intermediary system can generate an updated set of encrypted values using the second encryption key while maintaining access to the set of encrypted values. The operations can include detecting that the file has stopped at a particular intermediary system prior to being transferred to the cloud database. The particular intermediary system can correspond to the intermediary system or another intermediary system via which the file is transferred from the mainframe database to the cloud database. The operations can include, in response to detecting that the file has stopped at the particular intermediary system, determining an action to perform at the particular intermediary system to continue transferring the file to the cloud database. The operations can include outputting a command to the particular intermediary system to perform the action.

DETAILED DESCRIPTION

Figure 1:
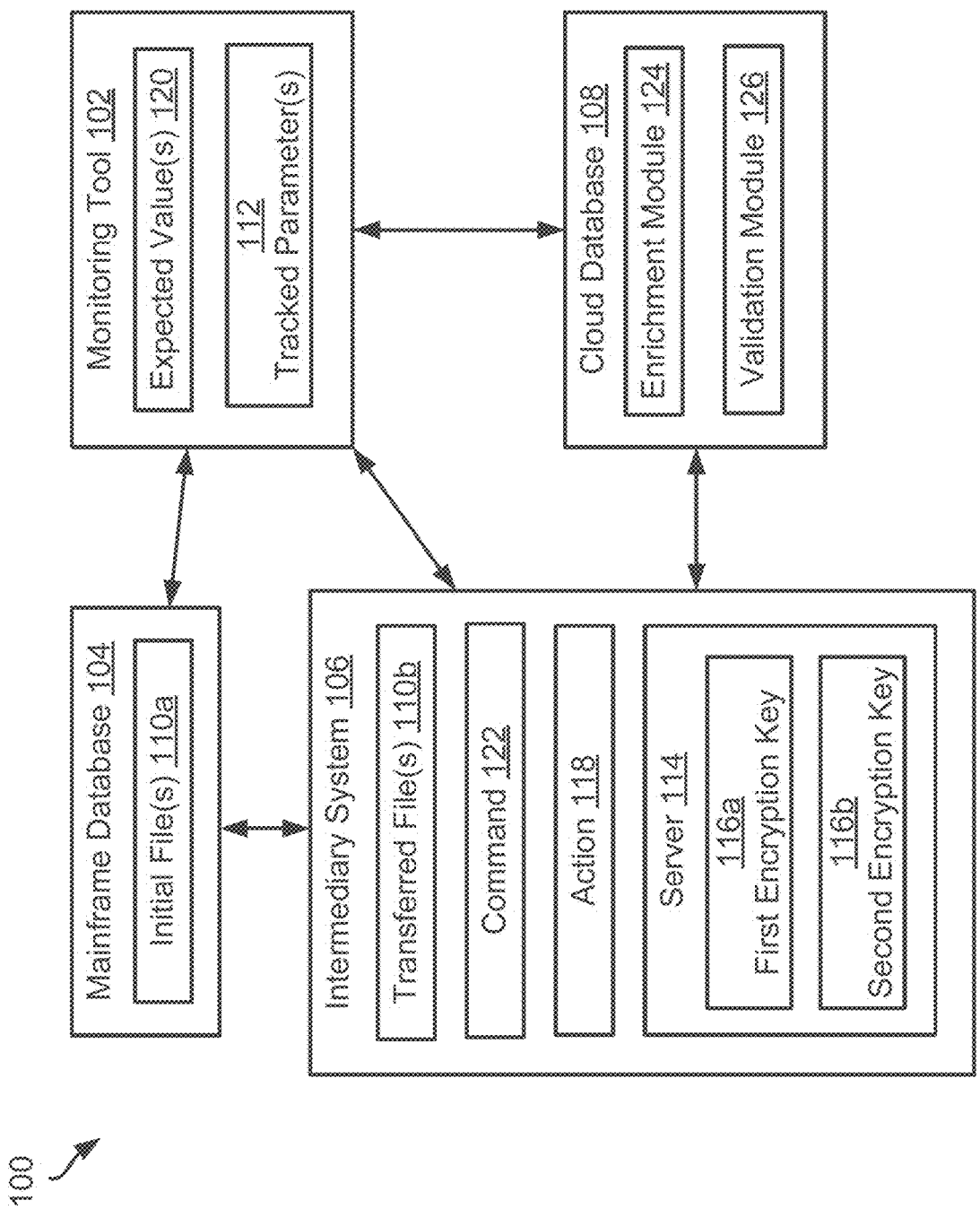
FIG. 1 is a block diagram of an example of a computing environment to manage a file transfer process for an automatic database update, according to some aspects of the present disclosure.

Certain aspects and examples of the present disclosure relate to managing a file transfer process for an automatic database update. The database update can involve enriching one or more files by updating or adjusting one or more data fields of the files. In some cases, enriching the files may involve recognizing data types within fields of a file, splitting data to occupy a greater number of fields, compressing data to occupy a smaller number of fields, reordering data fields, or changing the number of data fields to make a file adhere to an updated format. Each file can include interaction data corresponding to one or more interactions, such as a resource transfer between two entities. Prior to being enriched at a destination database, the files may be transferred from a starting database to the destination database through a migration process. The migration process can involve transferring the files from the starting database to one or more intermediary systems before being received by the destination database.

In some implementations, file enrichment of the files may be unable to occur in the starting database, such as due to technical restrictions. Consequently, the migration process can be implemented to transfer the files from the starting database to the destination database at which the files can be enriched. But the migration process may involve transferring a large number (e.g., 1000, 10,000, 100,000 or more) of files from the starting database to the destination database. Each transfer of the files, such as from the starting database to an intermediary system or between intermediary systems, can cause changes to the files to occur. In some cases, an improper transfer of the files may result in missing data or incorrect data (e.g., missing files, missing data fields, misplaced data fields, etc.). Additionally, a subset of the intermediary systems may apply adjustments or transform the files, such as through encryption, providing additional possibilities for discrepancies to arise in the files during the migration process.

Some examples described herein can address one or more of the abovementioned problems using a system to manage the file transfer process used to perform an automatic database update. The system can monitor the file during the migration process to determine whether discrepancies between a current version and a prior version of the files are present. For example, the system can compare one or more tracked parameters of the files after being received at an intermediary system to one or more starting parameters at the starting database. Examples of the tracked parameters of the files can include a quantity of interactions, entity identifiers, interaction type, etc. If the tracked parameters at the intermediary system are different from the starting parameters at the starting database, the system can determine that there are discrepancies to correct. Based on the discrepancies of the files, the system can determine an action to resolve the discrepancies. Once the system determines the action, the system can provide a command to the intermediary system or to a suitable database to perform the action to resolve the discrepancies.

In some examples, the system can track a transfer of a file that includes interaction data corresponding to multiple interactions. The file can be transferred from a mainframe database to a cloud database with the mainframe database functioning as the starting database and the cloud database functioning as the destination database. In such examples, the mainframe database may include one or more specifications that prevent the file from being enriched, causing the file to be transferred to the cloud database for enrichment. During the migration process to the cloud database, the file can be transferred from the mainframe database to an on-prem server at which the file is encrypted using an encryption key that can be rotated on a regular basis, such as every week, every month, every year, etc.

The system can detect that the file has stopped at the on-prem server based on a wait time of the cloud database exceeding an expected time window. For example, the system may determine the expected time window using historical times taken by historical files of a similar size or data type to reach the cloud database from the on-prem server. Accordingly, the expected time window may be determined with respect to an average file size of the historical files. Based on detecting that the file has stopped at the on-prem server, the system can determine an action to perform at the on-prem server to continue transferring the file to the cloud database. The system may determine the action based on a cause associated with the file remaining at the on-prem server. For example, the system may determine that the file has stopped at the on-prem server due to a discrepancy in a hash total that can function as a checksum to verify data integrity with respect to the file at the on-prem server. If the checksum at the on-prem server is different from an expected value (e.g., a previously computed checksum), it may be relatively likely that data corruption or other errors were introduced in the file while or after transferring the file to the on-prem server.

In some cases, the system may determine an update to apply to the file such that the checksum matches the expected value. For instance, the system can determine the update by comparing the file at the on-prem server to a prior version of the file at the mainframe database. Based on differences between the file and the prior version of the file, the system can output a command to the on-prem server such that the on-prem server adjusts the file at the on-prem server to ensure data integrity of the file. After the file is adjusted by the on-prem server, such as to ensure that the checksum matches the expected value, the system can determine whether the migration process of the file has resumed. In some implementations, if the file still remains at the on-prem server after the update is applied to the file, the system can determine a different action to be executed by the on-prem server with respect to the file to resume the migration process. In other implementations, if the migration process of the file resumes after the action is applied by the on-prem server, the system can continue monitoring the file as the file is transferred to the cloud database.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 to manage a file transfer process for an automatic database update, according to some aspects of the present disclosure. As illustrated, the computing environment 100 can include a monitoring tool 102 communicatively coupled with a mainframe database 104, at least one intermediary system 106, and a cloud database 108. The mainframe database 104 can be part of a mainframe computer that can connect to one or more client devices simultaneously, enabling access to different processes and applications concurrently executed by the mainframe computer. The cloud database 108 can be a database service built and accessed using a cloud computing platform, such as a public cloud environment or a hybrid cloud environment. In some examples, the cloud database 108 may be a managed database-as-a-service (DBaas) or may be deployed as a cloud-based virtual machine.

The mainframe database 104 can be a starting database in a migration process such that the mainframe database 104 can store one or more initial files 110a of various formats and sizes. In some examples, the mainframe database 104 may aggregate the initial files 110a from various databases, entities, or the like. The initial files 110a can be related to one or more entities, one or more users, one or more accounts managed by the entities or the users, etc. For example, the initial files 110a may include medical records originating from various hospitals and having various formats. As another example, the initial files 110a may receive various resource records from various resource providers. The initial files 110a can have different file types corresponding to various extensions, various applications, various syntaxes, various scripts or magic numbers, various types of computer code or computer language, or various unique identifiers. The mainframe database 104 may store the initial files 110a in their respective original formats.

Transferring the initial files 110a from the mainframe database 104 to the cloud database 108 can involve a migration process in which the initial files 110a are first transferred to at least one intermediary system 106 prior to being received by the cloud database 108. For example, as illustrated in FIG. 1, the initial files 110a can be transferred from the mainframe database 104 to the intermediary system 106. In some cases, the initial files 110a can be a first version of one or more files to be enriched at the cloud database 108, and transferred files 110b can be a second version of the files. In some examples, the computing environment 100 can include the monitoring tool 102 to track the transfer of the initial files 110a during the migration process. For example, the monitoring tool 102 can determine whether the migration process has been interrupted, such as due to one or more discrepancies between the initial files 110a and the transferred files 110b. The migration process being interrupted can correspond to the transferred files 110b being held at the intermediary system 106 until the discrepancies are resolved.

In other words, the cloud database 108 may be unable to receive the transferred files 110b until the migration process continues, such as after the discrepancies are resolved. Accordingly, in some examples, the monitoring tool 102 can determine whether the migration process has been interrupted based on whether the cloud database 108 receives the transferred files 110b within a predefined time window. For example, the monitoring tool 102 may log one or more tracked parameters 112 of the transferred files 110b based on output provided by the cloud database 108 after the cloud database 108 receives the transferred files 110b. Examples of the tracked parameters 112 can include a quantity of interactions, entity identifiers, interaction type, etc. If the monitoring tool 102 has not received the tracked parameters 112 from the cloud database 108 after the predefined time window has passed, the monitoring tool 102 may determine that the migration process has been interrupted. Additionally or alternatively, the monitoring tool 102 can determine whether the migration process has been interrupted based on an alert or another suitable indication issued by the intermediary system 106 to the monitoring tool 102. For example, the intermediary system 106 may generate the alert after identifying a discrepancy associated with the transferred files 110b.

In some cases, the discrepancies can arise due to the migration process generating one or more errors in the transferred files 110b. For example, a retrieval error can cause a discrepancy between the initial files 110a stored in the mainframe database 104 and the transferred files 110b stored in the intermediary system 106. In some instances, the retrieval error can cause the transferred files 110b to include less data compared to the initial files 110a. Examples of the retrieval error can involve an error with respect to retrieving a particular file, a particular row in the files 110, a particular column in the files 110, a particular data field in the files 110, or a combination thereof. For example, the retrieval error may cause an omittance of a particular data entry in the files, resulting in one or more incorrect entries subsequent to the particular data entry. The retrieval error can occur with respect to each transfer of the files 110 from a prior location, such as from the mainframe database 104 or from the intermediary system 106. In other words, the retrieval error can occur when retrieving the initial files 110a from the mainframe database 104 as well as when retrieving the transferred files 110b from the intermediary system 106. In examples in which the computing environment 100 includes more than one intermediary system 106, the retrieval error can occur when retrieving the files 110 from a previous intermediary system.

Additionally or alternatively, the intermediary system 106 may apply one or more changes to the transferred files 110b that can result in the discrepancies between the initial files 110a and the transferred files 110b. For example, the intermediary system 106 can include a server 114 at which the transferred files 110b are encrypted. In some cases, the server 114 may apply format-preserving encryption as a field-level encryption to the transferred files 110b. For example, the server 114 may encrypt each type of data field using the format-preserving encryption. The format-preserving encryption can maintain a particular format of encrypted values. As an example, if a particular data field to be encrypted includes a five-digit number sequence, applying format-preserving encryption to the particular data field can output an encrypted value that includes a different five-digit number sequence.

Additionally or alternatively, the server 114 may encrypt each entity identifier provided in the transferred files 110b. Example of the entity identifier(s) can include personal identifiable information, such as name, physical address, email address, account number or other identifying sequences, etc. The entity identifier(s) can indicate an originating entity that initiated a corresponding interaction included in the transferred files 110b. In some cases, the server 114 can implement a key rotation process to update an encryption key 116 used to encrypt the transferred files 110b periodically, such as monthly, yearly, etc. As described herein, a current encryption key used to the transferred files 110b can be a first encryption key 116a. A second encryption key 116b different from the first encryption key 116a can be used to replace the first encryption key 116a with respect to encrypting the transferred files 110b. After replacing the first encryption key 116a with the second encryption key 116b, the second encryption key 116b can be considered the current encryption key of the transferred files 110b. In some cases, the intermediary system may repeat this process of updating the current encryption key with one or more additional encryption keys.

In some examples, the key rotation process can involve generating an updated set of encrypted values used to replace a current set of encrypted values. For example, the current set of encrypted values can correspond to the entity identifier(s) that have been encrypted using the first encryption key 116a. Prior to replacing the current set of encrypted values, the intermediary system 106 can generate the updated set of encrypted values by encrypting the entity identifier(s) using the second encryption key 116*b*. As an example, the current set of encrypted values can be stored as a first column of a table in a database. After generating the updated set of encrypted values, the intermediary system 106 can store the updated set of encrypted values as a second column in the table. In some cases, the intermediary system 106 may generate the updated set of encrypted values by decrypting the current set of encrypted values and re-encrypting the decrypted values using the second encryption key 116*b*. By concurrently having both the current set and the updated set of encrypted values, the intermediary system 106 can enable other components in the computing environment 100 to continue using the current set of encrypted values while performing the key rotation process. Maintaining access to the current set of encrypted values can minimize downtime associated with the key rotation process.

In some examples, once the updated set of encrypted values encrypted using the second encrypted key 116*b* is generated, the intermediary system 106 may replace the current set of encrypted values with the updated set of encrypted values. As an example, the intermediary system 106 may update one or more mappings to the current set of encrypted values to redirect queries or other requests corresponding to the current set of encrypted values to the updated set of encrypted values. In some cases, prior to executing the key rotation process, the intermediary system 106 may adjust permissions associated with the transferred files 110*b* to prevent write operations. For instance, the intermediary system 106 may set the transferred files 110*b* to read-only permissions to prevent modifications to the transferred files 110*b* or to the encrypted values before or while executing the key rotation process.

To continue transferring the transferred files 110*b* to the cloud database 108, the monitoring tool 102 can determine an action 118 to perform at the intermediary system 106 to resolve the discrepancies. For example, the monitoring tool 102 may collect data associated with the initial files 110*a* and the transferred files 110*b* to identify the discrepancies between the initial files 110*a* and the transferred files 110*b*. For example, the monitoring tool 102 may monitor the tracked parameters 112 that may be prone to errors during the migration process or when the intermediary system 106 applies changes to the initial files 110*a*. As an example, the monitoring tool 102 may determine an initial quantity of interactions indicated in the initial files 110*a* to compare to a subsequent quantity of interactions in the transferred files 110*b*. The tracked parameters 112 of the initial files 110*a* can be considered one or more expected values 120 to which the tracked parameters 112 of the transferred files 110*b* are compared. Additionally or alternatively, the expected values 120 of the transferred files 110*b* can correspond to any tracked parameters of prior versions of the transferred files 110*b*. For example, if the computing environment 100 includes two intermediary systems, a first set of tracked parameters of the transferred files 110*b* at a prior intermediary system can function as the expected values 120 of a second set of tracked parameters at a subsequent intermediary system. The initial quantity of interactions differing from the subsequent quantity of interactions can indicate at least one discrepancy between the initial files 110*a* and the transferred files 110*b*.

As another example, the monitoring tool 102 can compare a first set of entity identifiers included in the initial files 110*a* to a second set of entity identifiers included in the transferred files 110*b* to determine whether the first set and second set of entity identifiers match. In some cases, the first set and the second set of entity identifiers may match, indicating that the transferred files 110*b* may have been transferred properly (e.g., without errors) to the intermediary system 106. In other cases, the second set of entity identifiers may include one or more erroneous identifiers (e.g., a missing identifier, a misplaced identifier, a misspelled identifier, etc.).

Based on the discrepancies, the monitoring tool 102 can determine the action 118 to perform at the intermediary system 106 or another suitable location in the computing environment 100 to resolve the discrepancies. For example, the action 118 may involve obtaining a prior version of the transferred files 110*b* from a previous location of the transferred files 110*b*. As illustrated, the prior version of the transferred files 110*b* can correspond to the initial files 110*a* stored at the mainframe database 104. The intermediary system 106 can execute the action 118 based on a command 122 outputted to the intermediary system 106 by the monitoring tool 102. For instance, the intermediary system 106 may execute the action 118 based on the command 122 by obtaining the initial files 110*a* from the mainframe database 104. As another example, the action 118 can involve applying an update to the transferred files 110*b* to match the initial files 110*a*. For instance, if a discrepancy of the transferred files 110*b* corresponds to a missing entity identifier in the transferred files 110*b*, the action 118 can be executed to update the transferred files 110*b* to include the missing entity identifier.

In some cases, the monitoring tool 102 may forgo the action 118 to resolve the discrepancies. For instance, the monitoring tool 102 may use a rule set to determine that the discrepancies causing the files to be stopped at the intermediary system can be resolved in a predefined amount of time without further intervention. As an example, the monitoring tool 102 may use a tracked parameter 112 of file size to determine that the file size of the transferred files 110*b* is greater than a baseline value. In some cases, the baseline value can be an average value determined using historical values of past file transfers from the mainframe database 104 to the cloud database 108. The monitoring tool 102 can determine that a delay in the cloud database 108 receiving the transferred files 110*b* results from a longer processing time taken to transfer a larger volume of the transferred files 110*b* than the baseline value. Accordingly, the monitoring tool 102 can forgo the action 118 to execute at the intermediary system 106. In some examples, the monitoring tool 102 may extend the predefined time window within which the cloud database 108 is expected to receive the transferred files 110*b*. If the cloud database 108 does not receive the transferred files 110*b* within the extended time window, the monitoring tool 102 can re-evaluate whether to perform an action 118 at the intermediary system 106.

The intermediary system 106 then can provide the transferred files 110*b* to the cloud database 108. Once the cloud database 108 receives the transferred files 110*b*, the cloud database 108 can apply one or more adjustments as file enrichment to update the transferred files 110*b*. For instance, the cloud database 108 may rearrange the transferred files 110*b* into an array of files to decrease processing time associated with the transferred files 110*b*. In particular, rearranging the transferred files 110*b* can facilitate file processing using parallel processing methods, such as via multiple processor threads or multiple distributed computing nodes. As another example, processing the array of files may involve fewer internal messages sent between components of the cloud database, thereby reducing processing time and computing resources used to process the array of files. In some examples, the cloud database 108 can execute an enrichment module 124 to perform the file enrichment. For example, the enrichment module 124 can receive the transferred files 110b as input and apply changes to the transferred files 110b to output enriched files. Additional details regarding file enrichment are provided below with respect to FIG. 2.

In some examples, the cloud database 108 can include a validation module 126 to verify the enriched files. For example, the validation module 126 may compare the enriched files with one or more internal files associated with a different data source than the mainframe database 104. In some cases, the internal files may be generated using a different system in the computing environment 100. If the validation module 126 detects discrepancies between the enriched files and the internal files, the validation module 126 can determine and execute an operation to resolve the discrepancies. For example, the operation executed by the validation module 126 may update the enriched files such that the enriched files match the internal files.

In some implementations, based on comparing the enriched files with the internal files, the validation module 126 can detect differences in a total quantity of interactions indicated in the files, a total amount of resources being transferred, etc. In examples involving financial or banking implementations, the validation module 126 may detect discrepancies in a total quantity of credit interactions or a total quantity of debit interactions indicated in the files. In some examples, the differences between the enriched files and the internal files may result from a mapping error (e.g., due to mapping credit interactions to debit interactions). Additionally or alternatively, a subset of the enriched files that have different data than the internal files may correspond to a particular originating entity that can be identified using a corresponding entity identifier.

Although FIG. 1 depicts a certain number and arrangement of components, this is for illustrative purposes and is intended to be non-limiting. Other examples may include more components, fewer components, different components, or a different arrangement of the components shown in FIG. 1. For example, although a single intermediary system 106 is shown in FIG. 1, the computing environment 100 may include more than one intermediary system that may perform different functionalities, such as applying different changes to the transferred files 110b.

Figure 2:
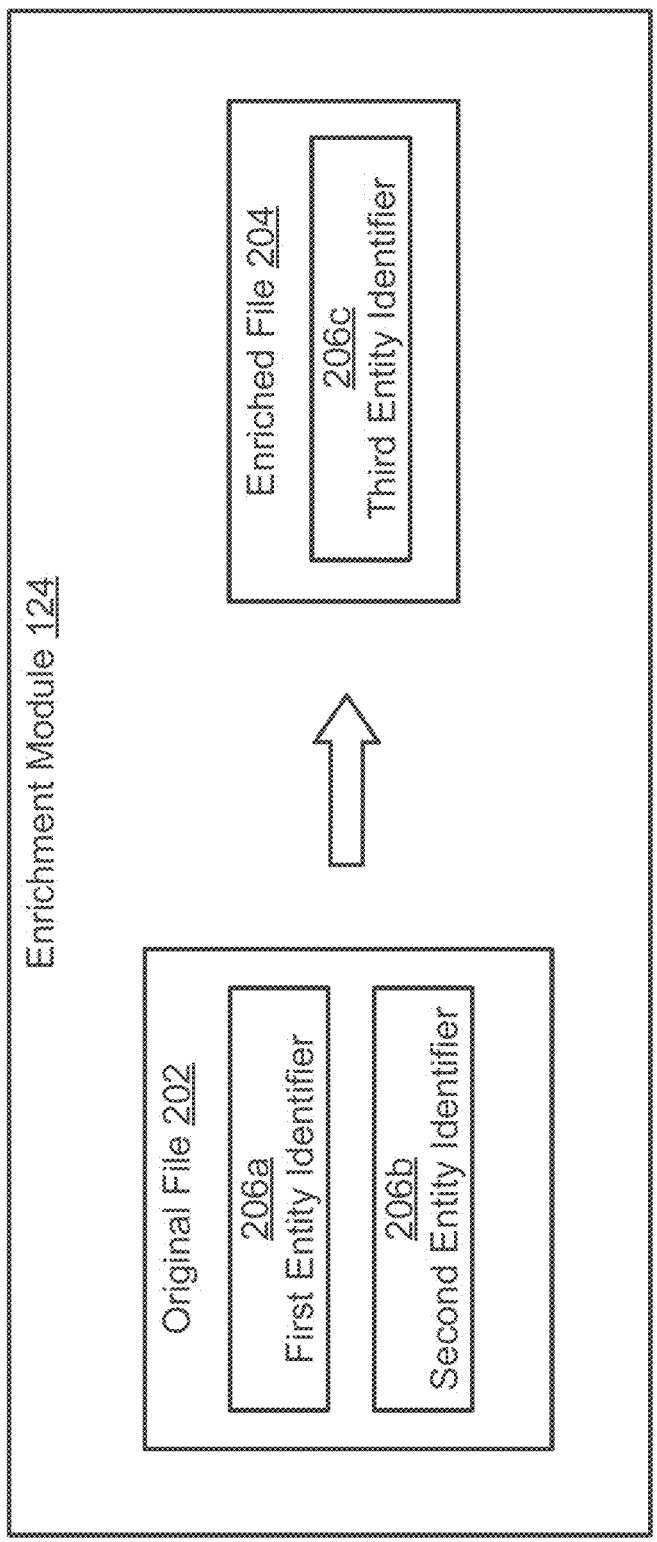
FIG. 2 is a block diagram of an example of an enrichment module for an automatic database update, according to some aspects of the present disclosure.

FIG. 2 is a block diagram of an example of an enrichment module 124 for an automatic database update, according to some aspects of the present disclosure. In some examples, as illustrated, the enrichment module 124 can correspond to the enrichment module 124 described above with respect to FIG. 1. The enrichment module 124 can perform a file enrichment process to convert at least one original file 202 to at least one enriched file 204. The file enrichment process can involve appending, adjusting, or otherwise modifying data in the original file 202 using additional data from other sources. In some cases, the original file 202 can be a particular file selected from the transferred files 110b of FIG. 1.

As illustrated, the original file 202 includes a first entity identifier 206a and a second entity identifier 206b. In some cases, the first entity identifier 206a can differ from the second entity identifier 206b while corresponding to the same entity. For example, the first entity identifier 206a may correspond to a virtual address of the entity, while the second entity identifier 206b may correspond to a physical address of the entity. To facilitate processing, the enrichment module 124 can enrich the original file 202 to generate the enriched file 204 having the first entity identifier 206a and the second entity identifier 206b replaced with a third entity identifier 206c corresponding to the entity.

Replacing the first and second entity identifiers 206a-b with the third entity identifier 206c can avoid mappings to indicate that the first and second entity identifiers 206a-b are associated with the entity, thereby conserving processing time and computing resources. Additionally, the third entity identifier 206c may include a sequence of characters that is shorter in length or otherwise simpler than the first and second entity identifiers 206a-b, further facilitating the processing and comprehension of the enriched file 204. In some instances, the third entity identifier 206c may replace more than two other entity identifiers in the original file 202. Although FIG. 2 depicts a file enrichment process to replace the first entity identifier 206a and the second entity identifier 206b with the third entity identifier 206c, other types of file enrichment are possible.

Figure 3:
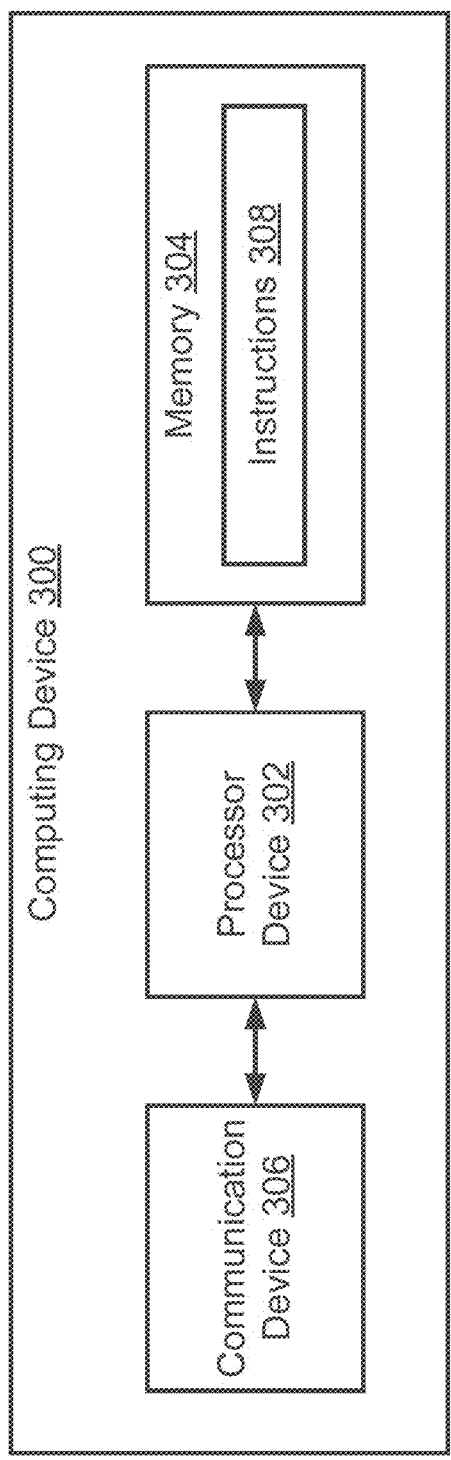
FIG. 3 is a block diagram of an example computing device to manage a file transfer process, according to some aspects of the present disclosure.

FIG. 3 is a block diagram of an example computing device 300 to manage a file transfer process, according to some aspects of the present disclosure. As illustrated, the computing device 300 can include a processor device 302 that is communicatively coupled to a memory 304, for example via a bus. In some examples, the processor device 302 and the memory 304 may be distributed from (e.g., remote to) one another. Additionally, the computing device 300 can include a communication device 306 communicatively coupled to the processor device 302 that can be used to receive or transmit data with respect to the computing device 300.

The processor device 302 can include one processing device or multiple processing devices. Non-limiting examples of the processor device 302 include a Field-Programmable Gate Array (FPGA), an application-specific integrated circuit (ASIC), a microprocessor, etc. The processor device 302 can execute instructions 308 stored in the memory 304 to perform operations. In some examples, the instructions 308 can include processor-specific instructions generated by a compiler or an interpreter from code written in a suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory, computer-readable medium from which the processor device 302 can read instructions 308. A computer-readable medium can include electronic, optical, magnetic, or other storage devices capable of providing the processor device 302 with computer-readable instructions or other program codes. Non-limiting examples of a computer-readable medium include magnetic disk(s), memory chip(s), ROM, random-access memory (RAM), an ASIC, a configured processor, optical storage, or any other medium from which a computer processor can read the instructions 308.

Figure 4:
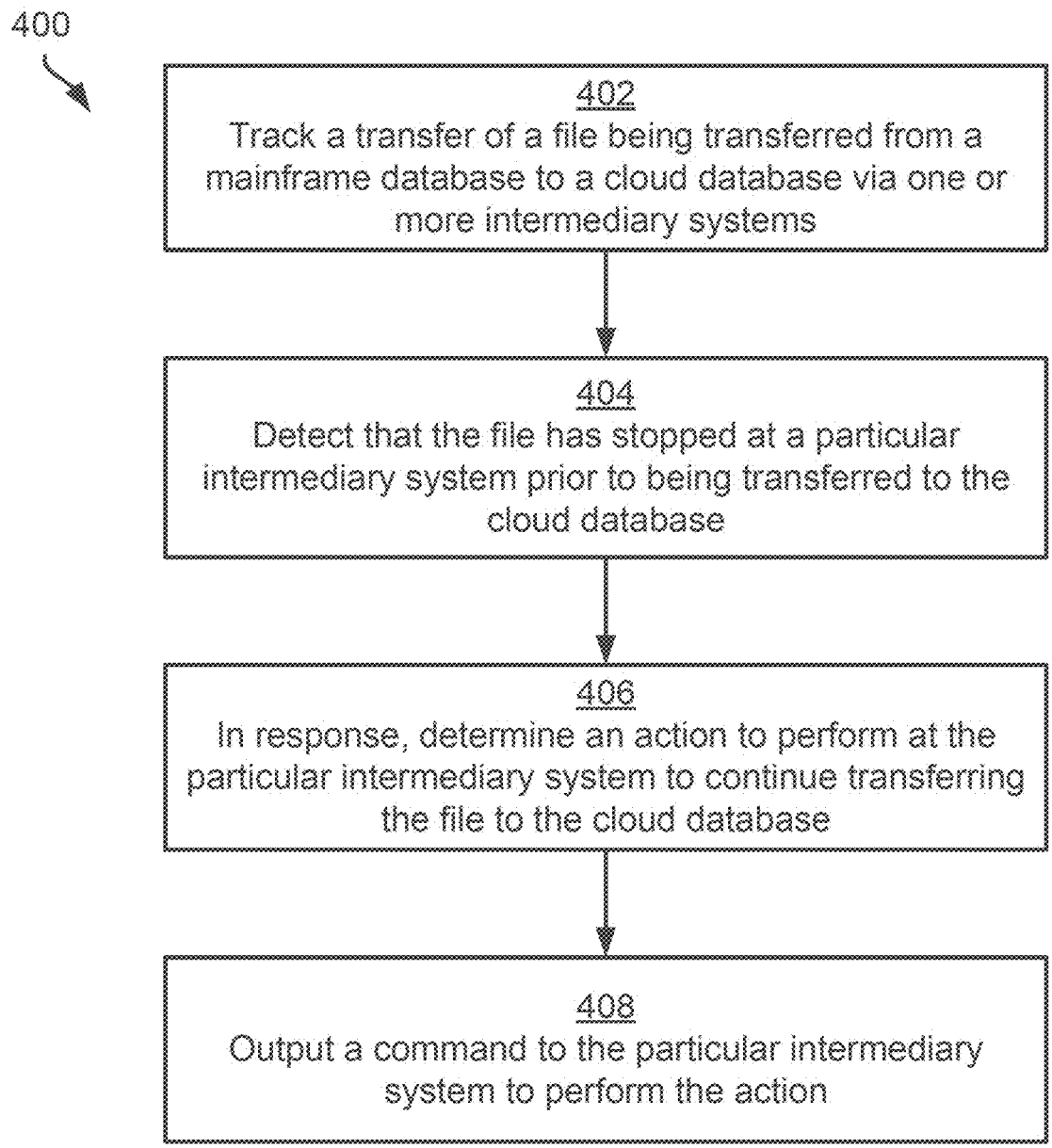
FIG. 4 is a flow chart of an example of a process for managing a file transfer process for an automatic database update, according to some aspects of the present disclosure.

Turning now to FIG. 4, shown is a flow chart of an example of a process 400 for managing a file transfer process for an automatic database update, according to some aspects of the present disclosure. Other examples can involve more operations, fewer operations, different operations, or a different order of operations shown in the figures. The operations of FIG. 4 will now be described below with reference to the components described above in FIGS. 1 and 3. Some or all of the steps of the process 400 can be performed by the processor device 302.

At block 402, the processor device 302 tracks a transfer of a file 110 including interaction data corresponding to one or more interactions. The file 110 can be transferred from a mainframe database 104 to a cloud database 108 via one or more intermediary systems 106 to enrich the file at the cloud database 108. The processor device 302 can receive one or more tracked parameters 112 from each system or database in a computing environment 100. For example, the processor device 302 can log the tracked parameters 112 of the file 110 prior to the file 110 leaving the mainframe database 104. Additionally, the processor device 302 may log the tracked parameters 112 subsequent to the file 110 being transferred to an intermediary system 106 between the mainframe database 104 and the cloud database 108 or to the cloud database 108.

At block 404, the processor device 302 detects that the file 110 has stopped at a particular intermediary system of the one or more intermediary systems 106 prior to being transferred to the cloud database 108. For example, the processor device 302 may determine that the file 110 has stopped at an intermediary system 106 including a server 114 to apply encryption to the file 110. In particular, the server 114 can apply format-preserving encryption as a field-level encryption to the file 110. The processor device 302 can detect that the file 110 has stopped at the intermediary system 106 based on whether the processor device 302 receives the tracked parameters 112 of the file 110 from a subsequent location after the intermediary system 106. If the processor device 302 has not received the tracked parameters 112 from the subsequent location, such as the cloud database 108 within a predefined time window, the processor device 302 can determine that the file 110 has stopped at the intermediary system 106.

At block 406, in response to detecting that the file 110 has stopped at the intermediary system 106, the processor device 302 determines an action 118 to perform at the intermediary system 106 to continue transferring the file 110 to the cloud database 108. In some cases, the intermediary system 106 can be a particular intermediary system of multiple intermediary systems included in the computing environment 100. In examples in the computing environment 100 includes multiple intermediary systems, continuing transferring the file 110 to the cloud database 108 can involve transferring the file 110 from the intermediary system 106 to a subsequent intermediary system.

The processor device 302 can determine the action 118 based on a cause resulting in the file 110 being stopped at the intermediary system 106. For example, the file 110 may be prevented from being transferred from the intermediary system 106 due to a discrepancy between the tracked parameters 112 of the file 110 and one or more expected values 120. The expected values 120 can correspond to the tracked parameters 112 of a prior version of the file 110 at a previous location in the computing environment 100. Accordingly, the action 118 determined by the processor device 302 can apply an update to a current version of the file 110 such that the current version of the file 110 matches the prior version of the file 110. As an example, the current version of the file 110 can correspond to the transferred files 110b of the intermediary system 106 in FIG. 1, while the prior version of the file 110 can correspond to the initial files 110a of the mainframe database 104.

At block 408, the processor device 302 outputs a command 122 to the intermediary system 106 to perform the action 118. In some examples, the processor device 302 may transmit a request to the intermediary system 106 including instructions to perform the action 118. For example, the instructions indicated in the request may be executed by the intermediary system 106 to update one or more data fields of the file 110. After the intermediary system 106 performs the action 118, the file 110 can be transferred by the intermediary system 106 to a subsequent location, such as the cloud database 108.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor device; and
a non-transitory computer-readable medium having instructions stored thereon that are executable by the processor device to cause the processor device to perform operations comprising:
transferring a file from a mainframe database to an intermediary system prior to transferring the file to a cloud database to enrich the file at the cloud database, the file comprising a set of encrypted values corresponding to interaction data of one or more interactions;
tracking, by a monitoring tool communicatively coupled with the mainframe database, the intermediary system, and the cloud database, a transfer of the file from the mainframe database to the cloud database by logging one or more tracked parameters of the file prior to the file leaving the mainframe database and each intermediary system;
subsequent to transferring the file to the intermediary system, applying a key rotation process to replace a first encryption key associated with the set of encrypted values of the file with a second encryption key, the intermediary system configured to generate an updated set of encrypted values using the second encryption key while maintaining access to the set of encrypted values;
detecting, by the monitoring tool, that the file has stopped at a particular intermediary system prior to being transferred to the cloud database, the particular intermediary system corresponding to the intermediary system or another intermediary system via which the file is transferred from the mainframe database to the cloud database;
in response to detecting that the file has stopped at the particular intermediary system, comparing, by the monitoring tool, a checksum of the file to an expected value to determine whether the file has a discrepancy, the checksum configured to verify data integrity of the file subsequent to transferring the file to the particular intermediary system;
determining, by the monitoring tool, an action to perform at the particular intermediary system to continue transferring the file to the cloud database; and
controlling, by the monitoring tool, the particular intermediary system by transmitting a command to the particular intermediary system to cause the particular intermediary system to perform the action, the monitoring tool configured to automatically output the command in response to determining that the comparison of the checksum and the expected value indicates that the discrepancy has been introduced in the file subsequent to transferring the file to the particular intermediary system.

2. The system of claim 1, wherein the operations further comprise, prior to applying the key rotation process:
adjusting one or more permissions associated with the file to read-only permissions, wherein the read-only permissions prevent modifications to the file while executing the key rotation process.

3. The system of claim 1, wherein tracking the transfer of the file to the cloud database further comprises:
logging the one or more tracked parameters of the file subsequent to the file being stored at each intermediary system and the cloud database.

4. The system of claim 3, wherein detecting that the file has stopped comprises determining that the file has stopped at the particular intermediary system based on at least one tracked parameter of the one or more tracked parameters differing from one or more expected values associated with a previous location of the file, and wherein the action to be performed is based on the difference.

5. The system of claim 3, wherein logging the one or more tracked parameters comprises tracking a respective quantity of interactions indicated in the interaction data of the file at the mainframe database, each intermediary system, and the cloud database.

6. The system of claim 1, wherein the file comprises format-preserving encryption as a field-level encryption.

7. The system of claim 1, wherein enriching the file at the cloud database comprises:
determining that a first entity identifier and a second entity identifier correspond to an entity associated with at least one interaction of the one or more interactions, wherein the first entity identifier is different from the second entity identifier; and
replacing each instance of the first entity identifier and the second entity identifier in the file with a third entity identifier associated with the entity.

8. The system of claim 1, wherein determining the action to perform at the particular intermediary system comprises:
detecting the discrepancy of the file, wherein the discrepancy involves a first quantity of interactions indicated in a current version of the file at the particular intermediary system being different than a second quantity of interactions indicated in a prior version of the file at the mainframe database;
determining that the discrepancy is caused by a retrieval error; and
in response to determining that the discrepancy is caused by the retrieval error, determining an update to apply to the current version of the file as the action to resolve the discrepancy to continue transferring the file to the cloud database.

9. A computer-implemented method comprising:
transferring a file from a mainframe database to an intermediary system prior to transferring the file to a cloud database to enrich the file at the cloud database, the file comprising a set of encrypted values corresponding to interaction data of one or more interactions;
tracking, by a monitoring tool communicatively coupled with the mainframe database, the intermediary system, and the cloud database, a transfer of the file from the mainframe database to the cloud database by logging one or more tracked parameters of the file prior to the file leaving the mainframe database and each intermediary system;
subsequent to transferring the file to the intermediary system, applying a key rotation process to replace a first encryption key associated with the set of encrypted values of the file with a second encryption key, the intermediary system configured to generate an updated set of encrypted values using the second encryption key while maintaining access to the set of encrypted values;
detecting, by the monitoring tool, that the file has stopped at a particular intermediary system prior to being transferred to the cloud database, the particular intermediary system corresponding to the intermediary system or another intermediary system via which the file is transferred from the mainframe database to the cloud database;
in response to detecting that the file has stopped at the particular intermediary system, comparing, by the monitoring tool, a checksum of the file to an expected value to determine whether the file has a discrepancy, the checksum configured to verify data integrity of the file subsequent to transferring the file to the particular intermediary system;
determining, by the monitoring tool, an action to perform at the particular intermediary system to continue transferring the file to the cloud database; and
controlling, by the monitoring tool, the particular intermediary system by transmitting a command to the particular intermediary system to cause the particular intermediary system to perform the action, the monitoring tool configured to automatically output the command in response to determining that the comparison of the checksum and the expected value indicates that the discrepancy has been introduced in the file subsequent to transferring the file to the particular intermediary system.

10. The computer-implemented method of claim 9, further comprising, prior to applying the key rotation process:
adjusting one or more permissions associated with the file to read-only permissions, wherein the read-only permissions prevent modifications to the file while executing the key rotation process.

11. The computer-implemented method of claim 9, wherein tracking the transfer of the file to the cloud database further comprises:
logging the one or more tracked parameters of the file subsequent to the file being stored at each intermediary system and the cloud database.

12. The computer-implemented method of claim 11, wherein detecting that the file has stopped comprises determining that the file has stopped at the particular intermediary system based on at least one tracked parameter of the one or more tracked parameters differing from one or more expected values associated with a previous location of the file, and wherein the action to be performed is based on the difference.

13. The computer-implemented method of claim 11, wherein logging the one or more tracked parameters comprises tracking a respective quantity of interactions indicated in the interaction data of the file at the mainframe database, each intermediary system, and the cloud database.

14. The computer-implemented method of claim 9, wherein enriching the file at the cloud database comprises:
determining that a first entity identifier and a second entity identifier correspond to an entity associated with at least one interaction of the one or more interactions, wherein the first entity identifier is different from the second entity identifier; and replacing each instance of the first entity identifier and the second entity identifier in the file with a third entity identifier associated with the entity.

15. The computer-implemented method of claim 9, wherein determining the action to perform at the particular intermediary system comprises:
  detecting the discrepancy of the file, wherein the discrepancy involves a first quantity of interactions indicated in a current version of the file at the particular intermediary system being different than a second quantity of interactions indicated in a prior version of the file at the mainframe database;
  determining that the discrepancy is caused by a retrieval error; and
  in response to determining that the discrepancy is caused by the retrieval error, determining an update to apply to the current version of the file as the action to resolve the discrepancy to continue transferring the file to the cloud database.

16. A non-transitory computer-readable medium comprising program code executable by a processor device for causing the processor device to perform operations comprising:
  transferring a file from a mainframe database to an intermediary system prior to transferring the file to a cloud database to enrich the file at the cloud database, the file comprising a set of encrypted values corresponding to interaction data of one or more interactions;
  tracking, by a monitoring tool communicatively coupled with the mainframe database, the intermediary system, and the cloud database, a transfer of the file from the mainframe database to the cloud database by logging one or more tracked parameters of the file prior to the file leaving the mainframe database and each intermediary system;
  subsequent to transferring the file to the intermediary system, applying a key rotation process to replace a first encryption key associated with the set of encrypted values of the file with a second encryption key, the intermediary system configured to generate an updated set of encrypted values using the second encryption key while maintaining access to the set of encrypted values;
  detecting, by the monitoring tool, that the file has stopped at a particular intermediary system prior to being transferred to the cloud database, the particular intermediary system corresponding to the intermediary system or another intermediary system via which the file is transferred from the mainframe database to the cloud database;
  in response to detecting that the file has stopped at the particular intermediary system, comparing, by the monitoring tool, a checksum of the file to an expected value to determine whether the file has a discrepancy, the checksum configured to verify data integrity of the file subsequent to transferring the file to the particular intermediary system;
  determining, by the monitoring tool, an action to perform at the particular intermediary system to continue transferring the file to the cloud database; and
  controlling, by the monitoring tool, the particular intermediary system by transmitting a command to the particular intermediary system to cause the particular intermediary system to perform the action, the monitoring tool configured to automatically output the command in response to determining that the comparison of the checksum and the expected value indicates that the discrepancy has been introduced in the file subsequent to transferring the file to the particular intermediary system.

17. The non-transitory computer-readable medium of claim 16, wherein the operations further comprise, prior to applying the key rotation process:
  adjusting one or more permissions associated with the file to read-only permissions, wherein the read-only permissions prevent modifications to the file while executing the key rotation process.

18. The non-transitory computer-readable medium of claim 16, wherein tracking the transfer of the file to the cloud database further comprises:
  tracking a transfer of the file from the mainframe database to the cloud database by logging the one or more tracked parameters of the file subsequent to the file being stored at each intermediary system and the cloud database.

19. The non-transitory computer-readable medium of claim 18, wherein detecting that the file has stopped comprises determining that the file has stopped at the particular intermediary system based on at least one tracked parameter of the one or more tracked parameters differing from one or more expected values associated with a previous location of the file, and wherein the action to be performed is based on the difference.

20. The non-transitory computer-readable medium of claim 18, wherein logging the one or more tracked parameters comprises tracking a respective quantity of interactions indicated in the interaction data of the file at the mainframe database, each intermediary system, and the cloud database.

* * * * *